Figure 3:
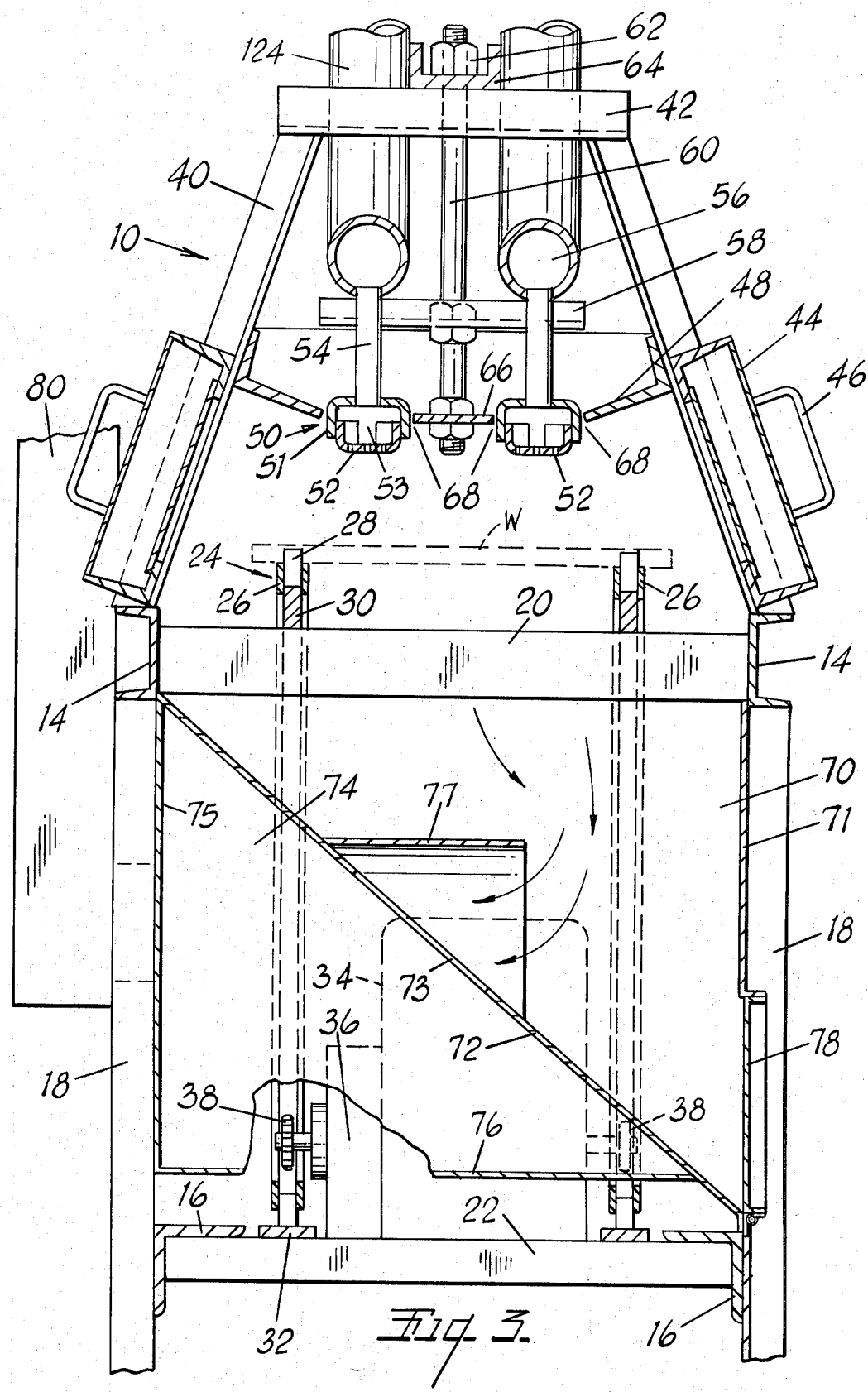

United States Patent [19]
McAlpine

[11] 3,813,214
[45] May 28, 1974

[54] DRYING OVEN FOR LEAD BATTERY PLATES

[75] Inventor: Charles H. McAlpine, Coloma, Mich.

[73] Assignee: Mac Engineering & Equipment Company, Inc., Benton Harber, Mich.

[22] Filed: May 14, 1973

[21] Appl. No.: 359,859

[52] U.S. Cl................ 432/144, 432/146, 432/176, 34/216, 34/236
[51] Int. Cl............................................. F27b 9/28
[58] Field of Search............ 432/8, 11, 14, 31, 133, 432/152, 153, 144–150, 176; 34/28, 36, 219, 216, 222, 218, 236, 105

[56] References Cited
UNITED STATES PATENTS

| 1,676,590 | 7/1928 | Staler................. 432/133 |
| 2,068,434 | 1/1937 | Rose..................... 34/36 |
| 2,149,813 | 3/1939 | Lindstrom........... 432/146 |
| 2,656,399 | 10/1953 | Hindall et al............ 34/216 |
| 2,780,453 | 2/1957 | Coffman et al............ 432/146 |
| 3,314,158 | 4/1967 | Carson et al............ 34/216 |

Primary Examiner—John J. Camby
Assistant Examiner—Henry C. Yuen
Attorney, Agent, or Firm—Austin A. Webb

[57] ABSTRACT

A conveyor advances newly formed battery plates with wet pellets of lead oxide and sulphuric acid in flatwise relation through an enclosure. Gas fired radiant heaters in the first half of the enclosure heat the upper surface of the plates to around 350° F. Air drawn from around the burners and the heated plates is drawn from the first half of the enclosure at about 275°F. This air is tempered or cooled to about 250°F by air drawn from the second half of the enclosure and recirculated into the second half of the enclosure where it is distributed over the surface of the heated plates. The output of the blower which circulates the air delivers to a regulating damper which exhausts about one-third the output of the blower and directs the remaining two-thirds to the recirculating circuit.

6 Claims, 5 Drawing Figures

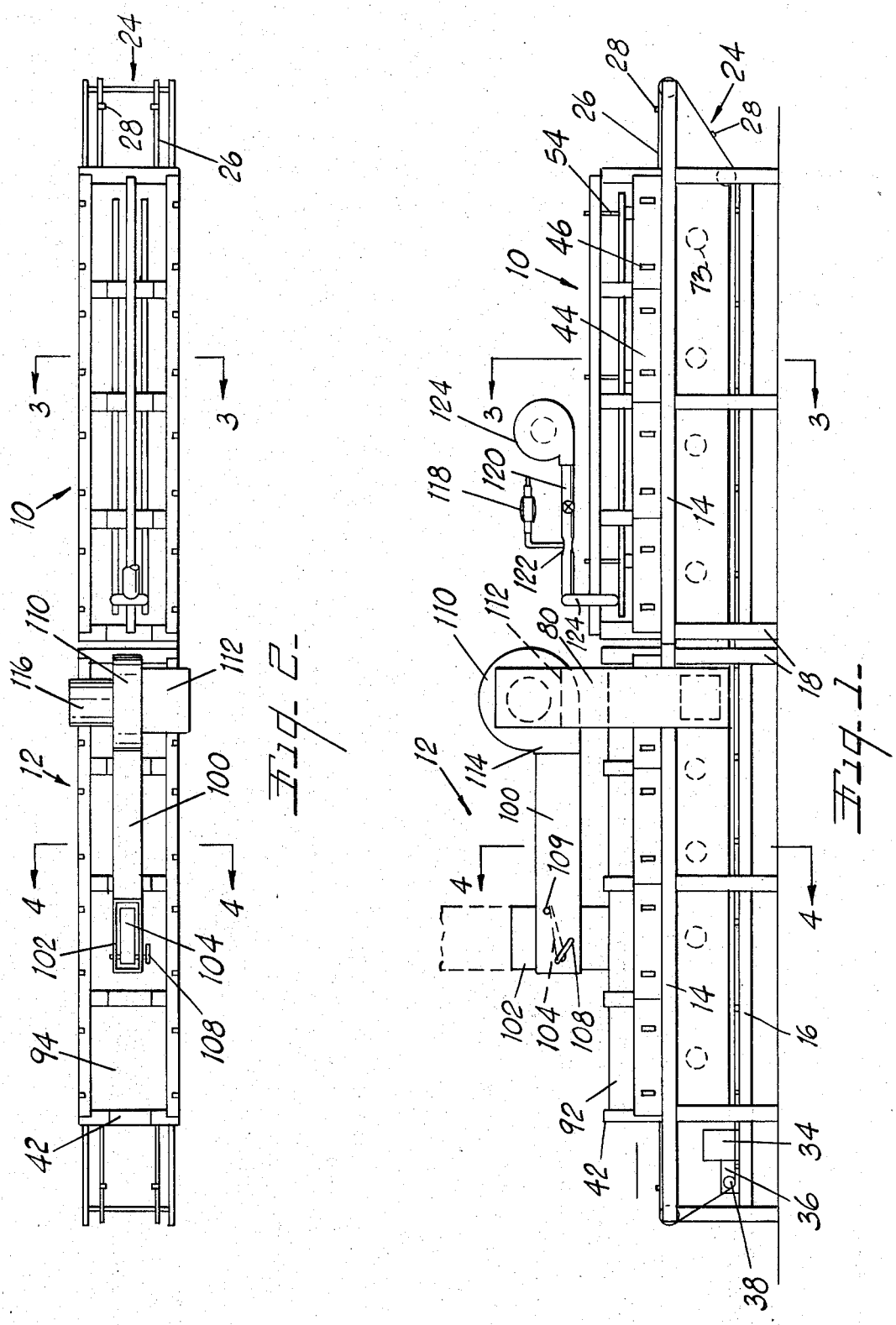

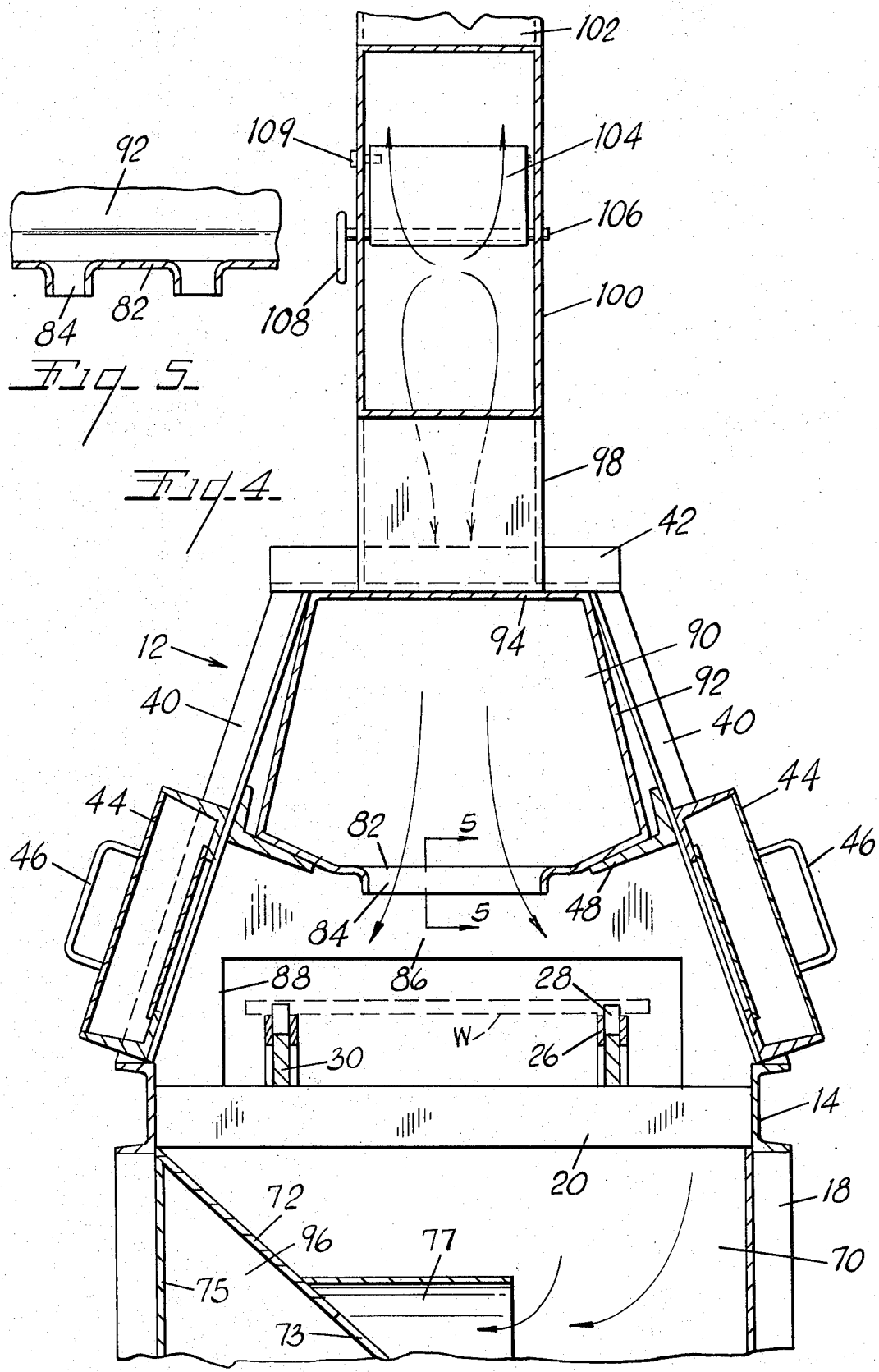

DRYING OVEN FOR LEAD BATTERY PLATES

OUTLINE OF INVENTION

It was known prior to this invention that battery plates could be dried by first subjecting them to heat and then subjecting them to hot air drawn from the heating section of an oven conveyor. It is the improvement and discovery of this invention that improved curing of the pellets of the battery plates is accomplished by proportioning the heating, cooling, and air circulating rates, and that these rates are most economically achieved by proportioning the capacity of the heaters, the size or capacity of the air circulating blower and the time intervals of heating and cooling and the proportion of intake air to recirculated air as will be described. The plates consist of metallic lead grids within the openings of which a wet paste of lead oxide and sulphuric acid, known as battery paste, is pressed just prior to drying and curing in the oven. In the drying process, the lead oxide is converted to lead sulphate and water is driven off. The metallic lead content of the paste is reduced to 15 percent when the plates leave the oven and is further reduced to 5 percent or less by further curing after leaving the oven.

DESCRIPTION

The drawings, of which there are three sheets, illustrate a practical and preferred form of the oven.

FIG. 1 is a side elevational view of the oven.
FIG. 2 is a top plan view.
FIG. 3 is a vertical transverse cross sectional view taken along the plane of the lines 3—3 in FIGS. 1 and 2.
FIG. 4 is a vertical transverse cross sectional view taken along the plane of the lines 4—4 in FIGS. 1 and 2.
FIG. 5 is a fragmentary vertical longitudinal cross sectional view taken along the plane of the lines 5—5 in FIG. 4.

The oven consists of a heating section 10 and a tempering section 12. As a matter of convenience in handling, these may be constructed separately, and joined at about the middle of the oven at assembly. The main structural framework consists of longitudinally extending upper rails 14 of channel shaped cross section and lower rails 16 of angle shaped cross section. The rails are supported on legs 18 and connected by cross bars 20 and 22. The framework can of course be varied, and the description of channels and angles is given only for ease of identification.

A conveyor indicated generally at 24 has an upper reach supported on the upper cross bars 20 and moving to the left in FIGS. 1 and 2. The lower reach is supported on the lower cross bars 22. The conveyor consists of suitable chain loops 26 which carry spaced work advancing blocks 28. Upright rails 30 support the blocks along the upper reach of the conveyor and plates 32 support the blocks along the lower reach of the conveyor. Driving means in the form of a motor 34 and gear box 36 drive sprockets 38 for driving the conveyor.

The supporting framework, conveyor and drive means are conventionally illustrated as a wide variety of structures can be used.

The enclosures over the upper reach of the conveyor are supported by a series of somewhat A-shaped frames having inclined legs 40 of T-shaped cross section and upper cross bars 42 of channel shaped section. A series of hollow, double walled doors 44 rest against T bars 40 and the side rails 14. The doors have handles 46 and are removable for inspection. Angle bars 48 extend longitudinally between the bars 40 mid-way of their height.

The upper wall of the enclosure in the heating section 10 (See FIG. 3) consists of two aligned series of sectional gas burners 50. The burners consist of downwardly facing rectangular metal castings 51 closed on the bottom by perforated ceramic cups or mantles 52. Aligned end apertures 53 permit consecutive ignition from one end of the series of burners to the other. The burners are old so are not disclosed in greater detail. The sections extend substantially the full length of the heating section. Each burner section is suspended by a supply nipple 54 from one of two supply pipes 56. The pipes are in turn supported on cross bars 58 hanging on bolts 60 suspended by nuts 62 from a longitudinal channel 64. A filler plate 66 supported by nuts on the lower ends of the bolts occupies space where a third series of burners may be installed if desired. It will be noted that narrow air passages 68 are left between the burners and the side rails 50 and the spacer filler plate. The gas fuel is burned almost completely within the burners and heats the ceramic cups 52 to an infrared heat which radiates to the work. Air drawn through the leakage passages as will be described cools the upper metal burner ports and prolongs their life while being heated itself.

Hot gases and air from the burners are drawn downwardly around and between the work pieces into a collecting chamber 70. The chamber is generally triangular in cross section and is formed by an upright rear wall 71 and an inclined wall 72. At spaced intervals along its length, the wall 72 has large holes 73 opening therethrough to a suction duct 74 formed along the lower side of the framework by a front plate 75 and a bottom plate 76 disposed above the lower reach of the conveyor. V-shaped hoods 77 prevent material from dropping through the holes and clean out doors 78 in the back wall permit removal of material which may flake off of the work plates. The duct 74 communicates with an upwardly extending suction duct 80 which will be described in greater detail presently.

The construction of the tempering section 12 of the oven appears most clearly in FIG. 4. The structural supporting elements are duplicate extensions of the parts in the heating section and are identified by the same numbers. The top closure of the oven consists of a plate 82 supported on the longitudinal angle bars 48. The plate has a series of transversely extending downwardly flanged nozzles 84 formed therethrough to direct air against the tops of the work pieces W. An end plate 86 closes the rear end of the oven except for an opening 88 to pass the conveyor and the work. The plate 82 forms the bottom of a plenum or delivery chamber 90 having side walls 92 and a top wall 94.

Below the conveyor, the tempering section has a collecting chamber 70 similar to that in the heating section, and holes 73 extend forwardly to a duct 96. The duct 96 is an extension of the duct 74 and also communicates with the bottom of the suction duct 80.

Opening to the top of the delivery chamber 90 is a supply duct 98. A blower outlet duct 100 extends horizontally over the tempering section and opens into the side of the duct 98. Duct 98 extends upwardly as an exhaust duct 102, and a damper 104 pivoted in the intersection of the two ducts as at 106 serves to divide the flow of air in the blower duct 100, directing part to the outlet and part to the delivery chamber 90. A control for regulating or adjusting the proportion of exhausted air to recirculated air is indicated conventionally by the handle 108. A stop 109 prevents complete closure of the outlet or exhaust duct 102, so a vent for purging the oven is always open.

A blower 110 appearing in FIGS. 1 and 2 has its intake side connected by a short cross duct 112 to the upper end of suction duct 80. The outlet 114 of the blower discharges into the duct 100 to complete the air circulating passages. A motor for driving the blower is conventionally indicated at 116.

The fuel supply to the burners is old but is described briefly to show its relation to the remainder of the oven. A regulator 118 delivers gas at zero pressure which is drawn off through pipe 120 by a venture 122 into which combustion air is blown by blower 124 at a variable rate. The blower thus controls the rate of burning. Manifold pipes 124 deliver the fuel to the distribution pipes 56.

OPERATION

The work pieces W are placed on the inlet end of the conveyor in a wet molded semi-plastic condition. With the burners 52 in operation, the ceramic cups develop a temperature approacing 1,500°F. and radiate on the work. Quantitatively, for most battery plates it is desirable to burn fuel at a rate of about 300,000 B.T.U. per hour. This develops a bulb temperature along the tops of the plates of about 350°F. The conveyor operates at between 50 and 100 feet per minute, with 75 feet per minute being preferred. As a result, in a heating section about ten feet long, the plates are subjected to this intense heat for 10 to 15 seconds before passing into the tempering section 12 of the oven. The still hot gases are mixed with air leaking through the openings 68 and the end of the oven drawn from underneath the work plates through the passages 70, 73 and 74 to the duct 80, where they are mixed with cooler gases from the duct 96. The blower 100 moves the mixture to the regulating damper 104, and a fraction of the mixture is delivered through the chamber 90 and ports 84 against the tops of the superheated plates.

The capacity of the blower in the example illustrated is about 4,000 cubic feet per minute, about half of which is heated by passing over the burners and around the work, with the result that the plates are subjected to a tempering flow of air at about 250°F. The setting of the damper 104 acts as a control for the temperature of the tempering air, with about one-third or less of the air being exhausted and two-thirds or more being recirculated at a temperature of 250° F. or more.

The action in the tempering section of the oven is twofold. The semi-plastic plates entering the section are extremely hot on the top surface, cooler on the bottom, and still cooler in their interiors. As the water in the lead oxide and sulphuric acid paste of the plates is driven off by heat, an exothermic reaction takes place as the lead is converted to lead sulphate, so the tempering air actually cools or takes away excess heat from the outer surfaces of the plates, while heat flow inwardly from the heated surface plus exothermic heat progressively evaporates water from the interior mass of the plates. The chemical solidifying and drying of the mass thus takes place without disruptive boiling off of the water and without objectionable crazing or development of fine cracks in the lead sulphate pellets of the grid plates. When the plates are delivered from the left end of the oven they are sufficiently hardened to be handled, and are dry enough to be stacked for final curing, and hardening without becoming stuck together. The lead oxide content is reduced to about 15 percent when leaving the oven, which further reduces to less than 5 percent after 24 hours air curing.

While gas fired radiant heaters have been disclosed, electric resistance heaters, with similarly spaced and downwardly or inwardly directed elements could be substituted.

What is claimed as new is:

1. In a plate drying oven having a conveyor arranged to advance plates to be dried,
   flight blocks on said conveyor arranged to advance said plates in a horizontal flatwise position,
   a framework supporting the upper working reach of said conveyor,
   means including a plurality of downwardly facing radiant heaters supported by said framework in spaced relation over said conveyor and the plates thereon and forming part of a first enclosure over the infeeding end of said conveyor and extending a substantial distance therealong,
   said heaters being spaced to provide air inlet openings therebetween,
   means including an elongated distribution duct having downwardly discharging air outlets in its bottom wall located over said working reach and forming a second enclosure as a longitudinal continuation of said first enclosure and extending from the outlet of the first enclosure a substantial distance over the remainder of said conveyor,
   upright rear panels on said framework depending below said conveyor along the rear of said enclosures,
   inclined panels on said framework extending longitudinally thereof from below the front side of said conveyor to the lower edges of said rear panels and coacting therewith and with the underside of said conveyor to form a duct of triangular cross section,
   said inclined panels having air flow openings therein at spaced intervals therealong,
   upright front panels on said framework depending from the front edges of said enclosures and extending longitudinally therealong,
   generally horizontally bottom panels extending between the lower edges of said front panels and lower portions of said inclined panels and coacting therewith to form a second duct of triangular cross section arranged to receive air from said openings in said inclined panels,
   walls forming a suction duct located in front of said framework and intermediate of the ends thereof,
   said suction duct communicating with said second triangular duct,
   a blower having its inlet connected to said suction duct,
   a pressure duct extending from the outlet of said blower to said distribution duct and having an exhaust opening therefrom ahead of said distribution duct, and flow dividing baffle means in said pressure duct directing a major portion of the output of said blower to said distribution duct and a minor portion of the output to said exhaust opening.

2. An oven as defined in claim 1 in which said first and said second enclosures are approximately equal in length.

3. An oven as defined in claim 2 in which said blower is located over said second enclosure, said suction duct having a transversely extending portion at its upper end connected to the inlet of said blower.

4. An oven as defined in claim 3 in which said burners have a combined capacity of at least 300,000 B.T.U. per hour and extend over said conveyor for at least 10 feet, said second enclosure extending along said conveyor for at least an additional 10 feet, said blower having a capacity of at least 4,000 cubic feet per minute, and said baffle means being arranged to direct at least two-thirds of the output of the blower to said distribution duct.

5. An oven as defined in claim 4 in which said conveyor operates at a speed to advance plates therethrough in between 12 and 18 seconds.

6. In a plate drying oven having an elongated frame of rectangular cross section, a conveyor having an upper working reach supported on the top of said frame and adapted to advance plates flatwise therealong, means including a series of adjacent gas fired radiant heaters forming a first enclosure over the first half of said conveyor, means including a distribution duct having a plurality of downwardly opening outlets forming a second enclosure over the second half of said conveyor and communicating with said first enclosure, first duct means supported within said framework and open to the underside of said conveyor forming collecting ducts opposed to said enclosures, said collecting ducts having suction openings opening thereto at spaced positions therealong, a suction duct positioned within said framework and extending therealong and communicating with said suction openings, a blower having an inlet duct connected to said suction duct near the mid-section of the suction duct, an outlet duct connected between the outlet of said blower and said distribution duct and having an exhaust outlet opening, and baffle means in said outlet duct dividing the output of the blower with at least three-quarters of the output directed to the distribution duct.

* * * * *